No. 845,600. PATENTED FEB. 26, 1907.
A. WHITE.
PRESSURE EXPANSION ROTARY MOTOR.
APPLICATION FILED APR. 4, 1906.

2 SHEETS—SHEET 1.

Witnesses.

Inventor.
Arthur White,
By Benedict, Morsell & Caldwell,
Attorneys.

No. 845,600. PATENTED FEB. 26, 1907.
A. WHITE.
PRESSURE EXPANSION ROTARY MOTOR.
APPLICATION FILED APR. 4, 1906.
2 SHEETS—SHEET 2.
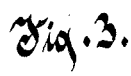
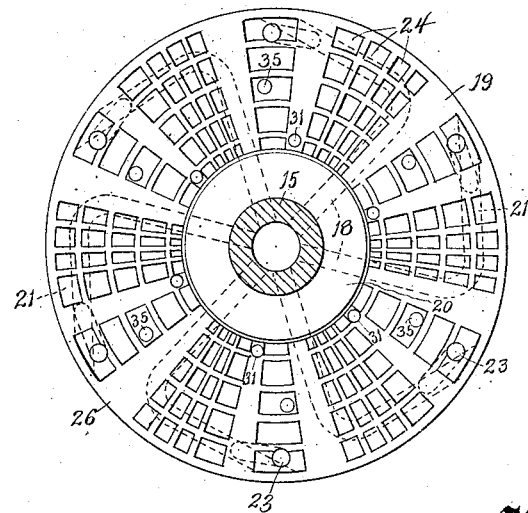
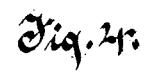
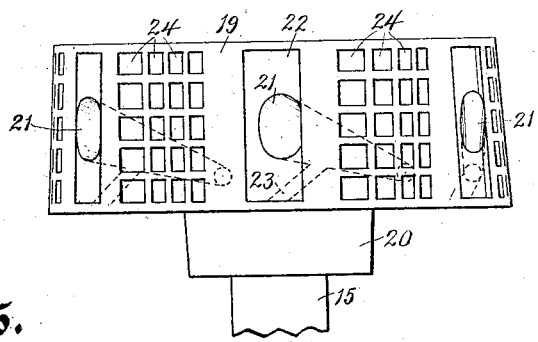
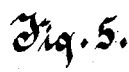
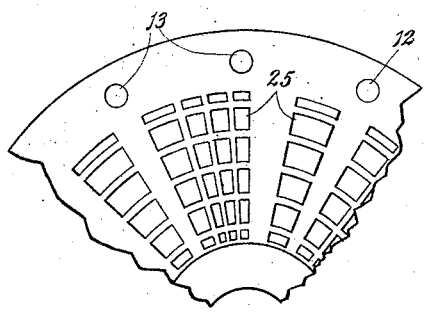
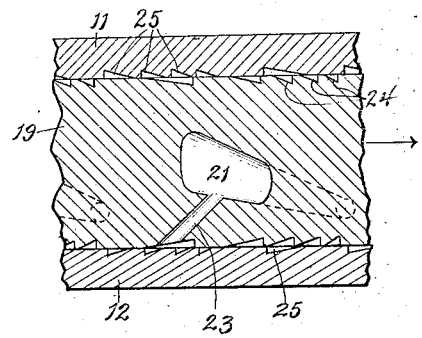
Witnesses.
C. H. Keeney,
Anna F. Schmidtbauer
Inventor.
Arthur White
By Benedict, Morsell & Caldwell.
Attorneys.

UNITED STATES PATENT OFFICE.

ARTHUR WHITE, OF SHEBOYGAN FALLS, WISCONSIN.

PRESSURE EXPANSION ROTARY MOTOR.

No. 845,600.　　　Specification of Letters Patent.　　　Patented Feb. 26, 1907.

Application filed April 4, 1906. Serial No. 309,758.

*To all whom it may concern:*

Be it known that I, ARTHUR WHITE, residing in Sheboygan Falls, in the county of Sheboygan and State of Wisconsin, have invented new and useful Improvements in Pressure Expansion Rotary Motors, of which the following is a description, reference being had to the accompanying drawings, which are a part of this specification.

This invention relates to rotary expansion-motors, and has for its object to provide a motor having a rotary member in a casing, with pockets formed in opposing active faces thereof, in which pockets steam or other pressure fluid may expand to produce rotation of the rotary member.

Another object of the invention is to so construct the rotary member of a motor of this type as to balance the pressures on opposite sides thereof, and thereby avoid end thrust.

Another object of this invention is to arrange the active faces of the movable member and the casing so that adjustment may be made to compensate for wear.

Another object of this invention is to provide a motor of this type with a supply-passage entering at the center of the movable member and radiating therefrom, forming approximately tangential nozzles at the periphery of the rotary member, the passage of fluid being inwardly to a central exhaust, whereby the greatest force of the pressure fluid is applied to the periphery of the rotary member where its effect will be the greatest, and the exhaust will be located at the center, where the back pressure will have the least effect.

Another object of this invention is to so position and proportion the size of the pockets of the active faces as to overcome the possibility of a free passage through them in any position of the movable member.

Another object of this invention is to provide for removing the water of condensation collecting in a motor of this type.

With the above and other objects in view the invention consists in the expansion-motor herein claimed, its parts and combinations of parts, and all equivalents thereof.

Figure 1:
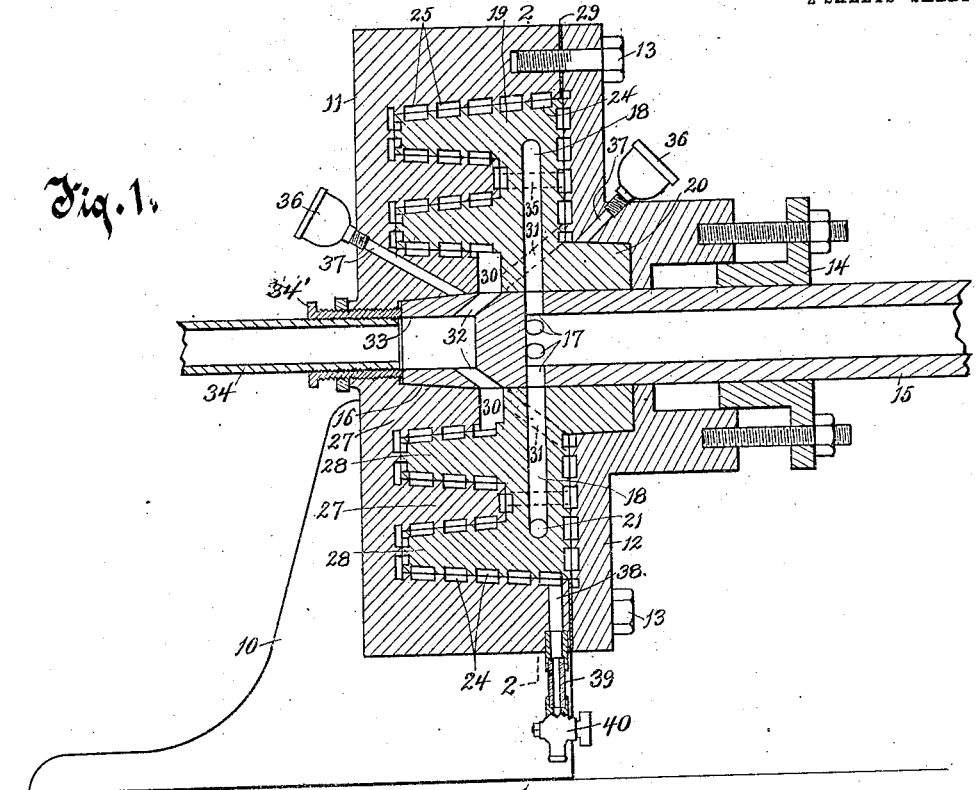
Figure 2:
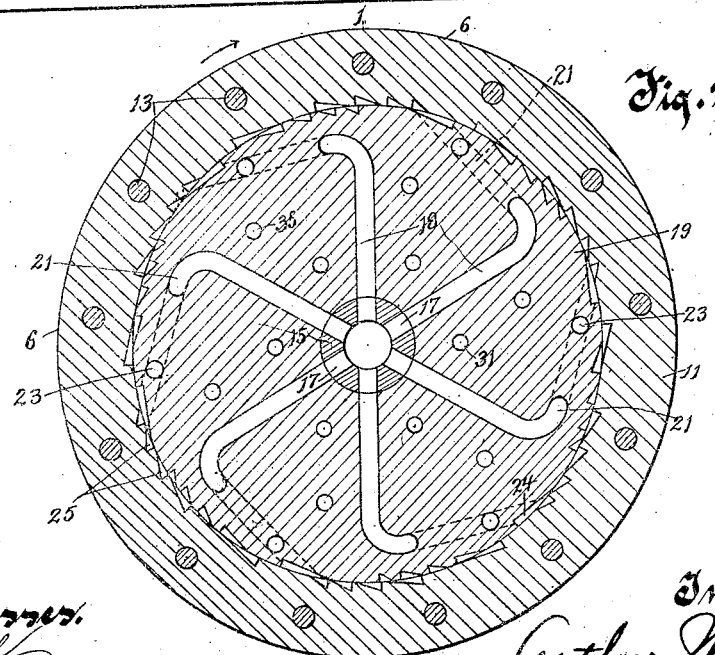

Referring to the accompanying drawings, in which like characters of reference indicate the same parts in the several views, Figure 1 is a vertical central sectional view of an expansion-motor constructed in accordance with this invention. Fig. 2 is a transverse sectional view thereof on the plane of line 2 2 of Fig. 1. Fig. 3 is an elevation of the front face of the movable member. Fig. 4 is a plan view thereof. Fig. 5 is a fragment of the front active face of the casing; and Fig. 6 is a sectional view of a fragment of a motor, taken on the plane of line 6 6 of Fig. 2.

In the drawings, 10 represents a base or support for a casing 11, which is of a cylindrical shape, with its face-plate 12 rigidly secured thereto by bolts 13 or other suitable means. Journaled in a projecting central portion of the face-plate 12 and surrounded by a packing-gland 14 is a tubular shaft 15, which has a tapering end seated in a correspondingly-shaped recess 16 in the interior of the casing. The bore of the tubular shaft 15 is closed before it reaches the end of said shaft, and here it communicates through radial openings 17 with radial passages 18 in a rotary member 19, which is fixed on the said shaft within the casing, with its tapering hub portion 20 fitting in a correspondingly-shaped recess in the face-plate 12. The radial passages 18 communicate with flaring nozzle-openings 21, which extend in the same rotary direction and as nearly at right angles to the radial passages as practicable, so as to approximate a tangential position. These flaring nozzles 21 open into V-shaped recesses 22, which extend almost entirely across the periphery of the rotary member, and near their outlet they have branch passages 23 leading therefrom to the front face of the rotary member near the edge thereof, these branch passages forming nozzles inclined with relation to the face of the rotary member, as the main nozzles 21 are inclined to the periphery thereof. The periphery of the rotary member between the recesses 22 is honeycombed with V-shaped pockets 24 of different lengths and arranged in parallel series, each having an abrupt wall practically radial of the rotary member and an inclined wall so as to form saw-teeth between them, all extending in the same rotary direction. The interior of the casing 11, which fits the tapering periphery of the rotary member, is similarly provided with pockets 25 to match the pockets 24 and coöperate therewith, but which form saw-teeth between them extending in an opposite rotary direction to those of the rotary member, as clearly shown in Fig. 2. The front face of the rotary member and the coöperating active face of the front plate 12 are provided with pockets 24 and 25, respectively, which are arranged in concentric rings and are grouped to provide plane surfaces 26 between them at intervals, as clearly shown in Figs. 3, 5, and 6. The meeting surface between the rotary member and the casing at the rear is made as large as practicable by forming one or more concentric flanges 27 on the casing, interfitting with one or more similar flanges 28 on the rotary member, this entire meeting surface being made up of series of pockets 24 and 25 in the faces of the rotary member and the casing, respectively, and the flanges being tapered at the same taper as the periphery of the rotary member, so that the adjustment of the rotary member with relation to the casing will affect all of the meeting surface alike. This adjustment is permitted by reason of the yielding nature of a gasket or packing-ring 29, which seals the joint between the front plate 12 and the edges of the casing 11, it being only necessary to tighten the clamping-bolts 13 to bring the meeting face of the rotary member and its coöperating parts nearer together.

At the extreme inner portion of the meeting surface between the rotary member and the casing 11 there is left an annular space 30 between these parts, into which the steam or other pressure fluid may discharge from the last series of pockets, and passage-ways 31 lead thereto through the rotary member from the last series of pockets on the front face thereof, this discharge-space serving as an outlet for the exhaust pressure fluid by communicating through passages 32 in the closed end of the tubular shaft 15 with a recess 33, which opens into an exhaust-pipe 34, threaded into an adjusting-bushing 34' at the center of the casing 11. At an intermediate portion of the meeting surface between the rotary member and the frame 11 there are one or more passages 35, connecting the opposite active faces of the rotary member to assist in maintaining an equal pressure on both sides of the rotary member, so that it shall be balanced in its operation, and thereby avoid frictional resistance and wear of the parts. Oil-cups 36 are connected to the casing 11 and the face-plate 12 to supply lubricant through inclined passages 37 to the tapering inner end of the shaft 15 and the tapering hub portion 20 of the rotary member, respectively, from which places the lubricant may spread to other parts requiring lubrication. At the lowermost portion of the frame 11 is a discharge-passage 36 for water of condensation which may accumulate in the motor, there being a sight-gage 39 leading therefrom with a petcock 40 on its lower end, through which the water of condensation may be discharged.

In operation steam under pressure is admitted to the tubular shaft 18 through any suitable coupling (not shown) and passes through the radial passages 18 to the nozzles 21, from which it is ejected forcibly against the pockets 25 of the casing around the periphery of the rotary member and by reaction therewith causes the rotation of the rotary member in the direction of the arrow in Fig. 2. Between the recesses 22 the steam expands in the closed chambers formed by the opposite pockets 24 and 25 to further assist in this rotation of the rotary member. From the pockets around the periphery of the rotary member the steam travels from one series of pockets to the next throughout the meeting surface between the rotary member and the frame, the play between these parts providing a limited communication between the successive series of pockets. In each series the steam serves by its expansion to add to the rotating effect upon the rotary member. Finally, on leaving the last series of pockets the steam passes out through the space 30, passages 32, and recess 33 to the exhaust-pipe 34. The steam which was discharged through the branch nozzles 33 likewise acts upon the coöperating faces of the front of the rotary member and the face-plate to further add to the rotating effect. When it has passed to the last series of pockets, it is discharged through the passage-ways 31 into the space 30, from which it exhausts with the other exhaust-steam. The size of the branch nozzles 23 proportions the amount of steam passing therethrough to the amount passing through the main nozzles 21, so that the pockets on the front of the rotary member receive no more than their proper amount of steam to produce the same amount of end thrust on the rotary member in one direction that is produced in the opposite direction by the steam passing around the other face of the rotary member, whereby the rotary member is balanced in its end pressures and end thrust is avoided. In order that this equalizing effect shall be more certain, the passages 35 are provided, connecting the intermediate portions of the meeting surfaces on both sides of the rotary member, through which the pressures on opposite sides may equalize, if there is a difference.

The pockets 24 and 25 being of different sizes and differently spaced prevent the formation of a through open passage around the complete series of pockets, as is clearly illustrated in Fig. 2, and thus the steam is always entrapped to some extent, so that its expansion will produce work in causing the rotation of the rotary member.

When the parts have become worn so that the passage of steam between the meeting faces is too free and the efficiency is thereby impaired, the parts may be adjusted closer together by changing the adjustment of bushing 34' and tightening the clamping-screws 13 so as to draw the face-plate 12 closer to the casing 11, which is permitted by the yielding nature of the gasket 29. This causes the parts to fit more tightly together, and by reason of the uniform taper to their interfitting surfaces the adjustment has the same effect throughout, and binding is not produced at one part before another part is completely adjusted.

What I claim as my invention is—

1. In an expansion-motor, a rotary member, a casing inclosing the rotary member and having concentric flanges interfitting with concentric flanges of the rotary member, pockets formed in the meeting faces of the rotary member and the casing, and means for discharging steam at the periphery of the rotary member, there being an outlet-opening for the exhaust-steam at the axis of the rotary member.

2. In an expansion-motor, a rotary member, a casing surrounding the rotary member, a tubular shaft on which the rotary member is fixed, there being passage-ways through the rotary member to conduct steam from the tubular shaft to the periphery of the rotary member, interfitting concentric annular flanges on the rotary member and on the casing, pockets formed in the meeting surfaces of the rotary member and the casing in which the steam is adapted to expand to produce rotation of the rotary member, there being a discharge-outlet for the exhaust-steam from the innermost pockets.

3. In an expansion-motor, a rotary member, a casing in which the rotary member is mounted, a face-plate for inclosing the rotary member within the casing, concentric tapering interfitting flanges on the casing and the rotary member, pockets formed on the meeting surfaces between the rotary member and the casing and the face-plate, a tubular shaft on which the rotary member is fixed, there being openings through the rotary member to conduct steam from the tubular shaft to the periphery of the rotary member and an outlet for the exhaust-steam leading from the innermost pockets, and means for detachably connecting the face-plate with the casing whereby wear between the parts may be compensated for.

4. In an expansion-motor, a rotary member, a casing inclosing the rotary member, a tubular shaft on which the rotary member is mounted, there being passage-ways leading from the tubular shaft through the rotary member and terminating in approximately tangential nozzles at the periphery of the rotary member, and pockets formed in the meeting faces of the rotary member and the casing from the periphery to near the axis of the rotary member, there being an outlet for the exhaust-steam leading from the innermost pockets.

5. In an expansion-motor, a rotary member, a casing inclosing the rotary member, a tubular shaft on which the rotary member is mounted, there being passage-ways leading from the tubular shaft to the periphery of the movable member, and series of V-shaped pockets formed in the meeting faces between the rotary member and the casing from the periphery to near the axis of the rotary member being so arranged as to avoid a through-passage between them at any time, there being a discharge for the exhaust pressure fluid leading from the innermost pockets.

6. In an expansion-motor, a rotary member, a casing containing the rotary member, a face-plate for inclosing the rotary member within the casing, interfitting concentric flanges on the rotary member and the casing, a tubular shaft on which the rotary member is mounted, there being passage-ways leading from the tubular shaft and terminating in nozzles at the periphery of the rotary member with branch nozzles leading to the meeting face between the rotary member and the face-plate, and series of pockets formed in the meeting faces of the rotary member and the casing and the face-plate, there being a discharge-outlet leading from the innermost pockets between the rotary member and the casing and passage-ways leading from the innermost pockets between the rotary member and the face-plate to said discharge-outlet.

7. In an expansion-motor, a rotary member, a casing containing the rotary member, a face-plate inclosing the rotary member within the casing, a hub on the rotary member fitting in the face-plate, a tubular shaft passing through the face-plate and fixed to the rotary member, a packing-gland between the face-plate and the tubular shaft, interfitting concentric tapering flanges on the rotary member and the casing, there being passage-ways leading from the tubular shaft through the rotary member and terminating in nozzles discharging at the periphery of the rotary member with branch nozzles leading therefrom and discharging at the meeting face between the rotary member and the face-plate, series of V-shaped pockets formed on the meeting faces of the rotary member and the casing and the face-plate and being so arranged as to avoid through connection between them in any position of the rotary member, the end of the tubular shaft being closed and fitted in the casing and having discharge-openings formed therein to lead the exhaust pressure fluid from the innermost pockets between the rotary member and the casing, there being passage-ways leading from the innermost pockets between the rotary member and the face-plate and connecting with said discharge-openings, an exhaust-pipe connecting with the casing and adapted to receive the exhaust pressure fluid from the discharge-openings, and oil-cups on the casing and the face-plate having passages leading to the end of the tubular shaft and the hub of the rotary member respectively.

8. In an expansion-motor, a rotary member, a casing in which the rotary member is inclosed, concentric tapering interfitting flanges on the casing and the rotary member, pockets formed on the meeting surfaces between the rotary member and the casing, a tubular shaft for admitting pressure fluid to the pockets at the periphery of the rotary member, an exhaust-pipe for conducting the exhaust pressure fluid at the center of the casing, and a bushing threaded on the exhaust-pipe and in the casing adapted to engage the end of the tubular shaft for adjusting the position of the rotary member.

In testimony whereof I affix my signature in presence of two witnesses.

ARTHUR WHITE.

Witnesses:
R. S. C. CALDWELL,
ANNA F. SCHMIDTBAUER.